(12) United States Patent
Moskowitz (10) Patent No.: US 6,175,199 B1
(45) Date of Patent: Jan. 16, 2001

(54) MAGNETICALLY DEFLECTED ARC LAMP (75) Inventor: Warren P. Moskowitz, Ipswich, MA (US)

(73) Assignee: Osram Sylvania Inc., Danvers, MA (US)

(*) Notice: Under 35 U.S.C. 154(b), the term of this patent shall be extended for 0 days.

(21) Appl. No.: 09/408,668

(22) Filed: Sep. 30, 1999

(51) Int. Cl.[7] .................................................. G05F 1/00
(52) U.S. Cl. ..................... 315/291; 315/194; 315/267; 315/82; 362/265
(58) Field of Search .................................. 315/194, 291, 315/307, 209 R, 82, 267; 362/261, 262, 265; 313/153, 155–162, 581, 607

(56) References Cited

U.S. PATENT DOCUMENTS 5,997,162 * 12/1999 English et al. ...................... 362/265
6,043,614 * 12/1999 Tessnow et al. .................... 315/291

* cited by examiner

Primary Examiner—Haissa Philogene
(74) Attorney, Agent, or Firm—William E. Meyer (57) ABSTRACT The arc of an alternating current discharge lamp may be magnetically straightened by including a small direct current component to the lamp current. The lamp may then be operated substantially as an alternating current lamp, but with out the need to synchronize the magnetic field with the alternating lamp current. The minor inclusion of the direct current component enables the lamp to be magnetically deflected effectively for arc straightening, optical positioning of the arc, offset positioning from the envelope wall to preserve lamp life, and other useful functions.

15 Claims, 9 Drawing Sheets

MAGNETICALLY DEFLECTED ARC LAMP

1. TECHNICAL FIELD

The invention relates to electric lamps and particularly to electric discharge lamps. More particularly the invention is concerned with magnetic deflection of an arc lamp.

2. BACKGROUND ART

Control of the vertical position of the arc in a horizontally-operated HID lamp is desirable in a number of lighting applications, particularly automotive HID headlamps. The reasons are several-fold, and depend on the application. In horizontal HID lamps, the arc is bowed upwards by buoyancy induced gas convection in the arc tube. Straightening the arc can improve lamp life and color by both eliminating overheating of the top of the arc tube and increasing the temperature of the fill chemicals which reside at the bottom of the arc tube. In addition, a straightened arc provides a light source which is more compatible with optical collection and projection systems. It may also be desirable to move the light beam which is projected from the optical system by deflecting the arc in a controlled manner.

Several techniques have already been used to straighten arcs of horizontally operated lamps. These include the use of narrow-bore arc tubes to constrain the arc; excitation of acoustic resonances in the gas in the arc tube; rotating the gas in the arc tube about the arc axis either by flowing the gas, or rotating the entire arc tube; and applying a downward force on the gas by applying a horizontally oriented magnetic field which is perpendicular to the arc axis.

The force on the arc by a magnetic field is the vector cross product of the arc current and the magnetic field. If the arc axis and the magnetic field are perpendicular, and both lie in the horizontal plane, the force is vertical. The direction and magnitude of the force depends on the product of the magnitude and direction of the magnetic field and the arc current. To maintain a downward force on an alternating current arc, therefore, the magnetic field must be an alternating current synchronized with the arc current. This approach has been demonstrated and has been proposed as a product for automotive headlamps. The problem with this approach is that the equipment required to produce an alternating current magnetic field of sufficient magnitude is large, cumbersome, energy-consuming, and heat producing. Positioning the magnetic pole-pieces without negatively-impacting the design of the optical fixture is a challenge. Early attempts to achieve magnetic deflection with alternating current failed. The electromagnets were too slow. It was believed, that it was not possible to create fast and alternating magnetic fields to follow the signal of the alternating current ballast. Recently this has been overcome as shown in U.S. patent application Ser. No. 09/099,379.

By contrast, a direct current arc is easily straightened or deflected by a constant magnetic field of a modest level which is easily achieved even at a significant distance from a permanent magnet. However, direct current is not desirable in HID lamps because the current flow in one direction causes migration of the chemicals toward the cathode and results in separation of the various color components of the arc. Additionally, the anode and cathode electrodes must be designed differently, and the entire arc tube constructed asymmetrically to account for the unequal heat loads, and sealing difficulties.

To be practical, the whole magnetically deflected arc lamp system must be simple and reliable. The lamp, the ballast and the magnetic system must each be inexpensive to manufacture, efficient to operate and reliable. A simple alternating current lamp would be useful, but this has required the synchronized magnets described. A simple permanent magnet or electromagnet would be useful, but this has required the less desirable direct current lamps. The combination has not been possible. The present Applicant has now found a solution.

DISCLOSURE OF THE INVENTION

The present invention improves method of magnetically deflecting an arc discharge, allowing deflection to be conveniently used on alternating current lamps in a simpler, less cumbersome, and more applicable fashion than has been previously done.

A magnetically deflected arc discharge lamp system may be formed with an alternating arc discharge lamp having an arc formed approximately horizontally between two electrodes. The lamp is substantially powered by an alternating current power; however, the arc current is designed to have on average a small direct current component. It has been found that the whole arc, otherwise operating substantially as an alternating current arc, may then be deflected by simple magnetic field device operating on the small direct current component. The whole arc may be deflected by a simple permanent magnet, or more complex electromagnetic systems.

BRIEF DESCRIPTION OF THE DRAWINGS

Like reference numbers identify like parts throughout the drawings and specification.

BEST MODE FOR CARRYING OUT THE INVENTION

The present invention overcomes the above mentioned limitations of applying magnetic deflection to alternating current arcs by applying a magnetic field in combination with the creation on average of a small direct current component in the arc current. This can be accomplished in several ways, including the direct addition of a direct current level to an alternating current waveform. A more preferred method, for square-wave driven lamps, is to vary the duty-cycle of a square wave away from 50%. The amount by which the duty cycle must be varied is inversely proportional to the magnetic field strength. Small and inexpensive permanent magnets are readily available with high magnetic field strengths. Many electronic ballasts supply square-wave current to the lamp by alternating the polarity of the lamp with a set of commutator transistor switches. Changing the timing of the signals controlling the commutator switches enables one to vary the duty cycle, and hence the effective deflection of the arc.

The virtue of this approach is that continuously adjustable arc deflection may be achieved with simple modifications to existing ballast electronics. In the preferred embodiment, a small, permanent magnet is placed in the lamp base. Selection of the magnetic strength, shape and location of the permanent magnet depends in part on the size of the direct current arc current component, the lamp characteristics and the amount of deflection sought. Such design tuning of the magnet, arc current, lamp and deflection are considered to be matters of design choice for HID lamp makers. When permanent magnets are used, there is no need for additional power cables or devices in the lamp fixture.

Figure 1:
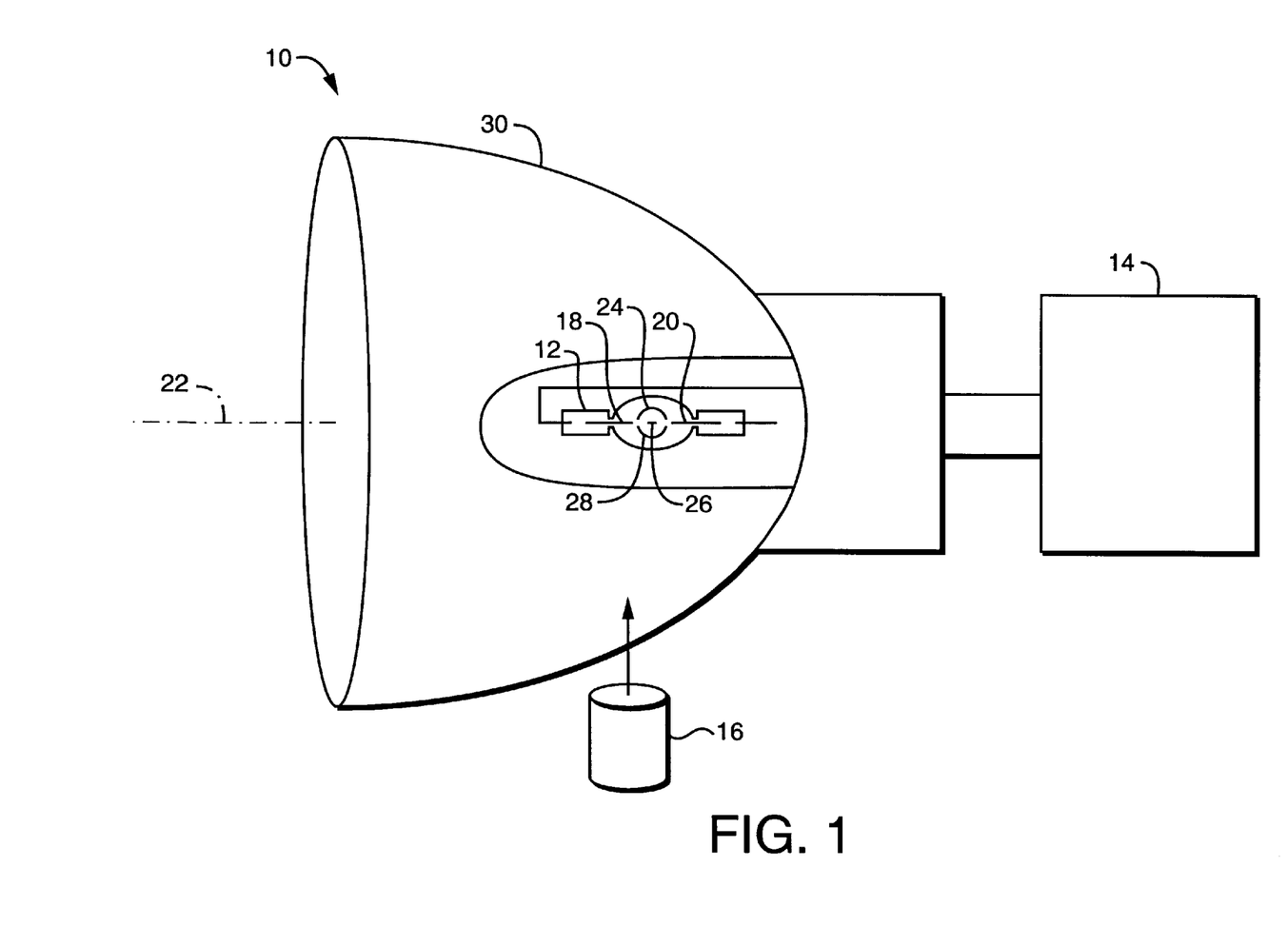
FIG. 1 shows a schematic side view of an arc discharge lamp system.

FIG. 1 shows a schematic diagram of a preferred embodiment of an alternating current vehicle HID lamp with magnetic deflection. The alternating current HID lamp with magnetic deflection lamp system 10 may be assembled from a miniature high intensity discharge (HID) lamp 12, an alternating current lamp controller 14, and a permanent magnet 16.

The preferred lamp is a substantially horizontally operated, miniature arc discharge lamp 12 with a first electrode 18 and a second electrode 20. The electrodes are preferably horizontally positioned along a lamp axis 22. The preferred miniature high intensity discharge (HID) lamp 12, may be any of numerous designs. The preferred embodiment is a double ended press sealed quartz body defining an enclosed volume of about 0.25 cubic centimeters, having a xenon and metal halide fill. The xenon pressure may be approximately 6 to 10 atmospheres cold, and about 60 atmospheres hot. The preferred lamp has an approximately ellipsoidal interior with a fairly open access around the electrode roots. The open geometry provides a better internal convective flow pattern particularly when the arc is magnetically deflected. The arc discharge lamp 12 without magnetic deflection normally provides a discharge, normal arc 24, generally extending along an upward bending line between a single tip end of the first electrode 18 and a single tip end of the second electrode 20. The interior dimensions of the envelope are chosen to provide sufficient volume that the arc 24 may be moved between preferred optical focal regions, for example to form a proper low beam for a vehicle in one focal region 26 and a proper high beam in a second focal region 28.

The lamp current controller 14 provides an alternating current with sufficient voltage and current to operate the lamp discharge. The preferred lamp current controller additionally provides lamp starting, and lamp ballasting features as known in the art. Additionally the lamp current controller provides on average a direct current component to the lamp operating current, at least at times when arc deflection is desired. The direct current component may be produced as a bias current, a wave form adjustment (higher peak, longer duration, etc), or similar adjustment to the powering current that on average provides a direct current aspect to the otherwise alternating current driving the lamp operation. The direct current portion of the operating current should be less than fifty percent of the whole operating current during the deflection period. Operation with twenty five percent direct current is expect, and operation at ten percent direct current has shown no detrimental effect on the electrodes or lamp. The direct current component needs to be produced during times when the lamp arc is to be deflected. There are numerous method of providing such a direct current component, the choice of which is a matter of election. The preferred power signal is a square wave signal with a relatively longer positive side duration, and a relatively shorter negative side duration. The measure of the direct current component may remain fixed, in which case, with a fixed magnetic field provided, for example by a permanent magnet, the arc has a fixed deflection. A normally undeflected arc may then be bowed, for example, from the normally upwardly bowed position 24 arc to a horizontally straight arc, low beam position 24. In the preferred embodiment, the direct current component from the lamp current controller 14 is adjustable to provide a varying direct current component. For example, the duration of the positive side square wave, may be increased with respect to the negative side. The lamp current controller 14 may receive a voltage signal indicating the degree of deflection desired. The relative duty cycle in the applied power signal is then proportionately adjusted, while the relative applied magnetic field remains the same, as would be the case with a permanent magnet. With an increased direct current component, the degree of arc deflection may be increased, for example from the horizontally straight arc, low beam position 26 to a downwardly bowed high beam position 28.

The permanent magnet 16 may, depending on its features (composition, magnetic strength, size, etc.) maybe placed at an appropriate distance from the arc 24 so as to adequately deflect the arc 24 to the desired direction. Magnetic field directing pole pieces may be used to assist in directing or sculpting the magnetic field as is known in the art. In the preferred embodiment, the permanent magnet and any pole pieces are located outside of the reflector region, to thereby not interfere with the projection of light by a reflector 30. The preferred permanent magnet 16 location is directly above or below the arc 24, and oriented so the magnetic field is centered between the two electrode tips, and perpendicular to the axis 22 extending between them. It is known that there may be optical design advantages to deflect the arc 24 somewhat to the right or left of the vertical plane in moving from a low beam position to a high beam position. Such horizontal deflection can assist the optical designer in properly locating the beam centers. In which case, the permanent magnet 16 may be located to the side or rotated around the axis 22 to be on the right or left of the vertical plane. It is understood that other positions of the permanent magnet 16 may be chosen for other desired deflection directions.

Figure 2:
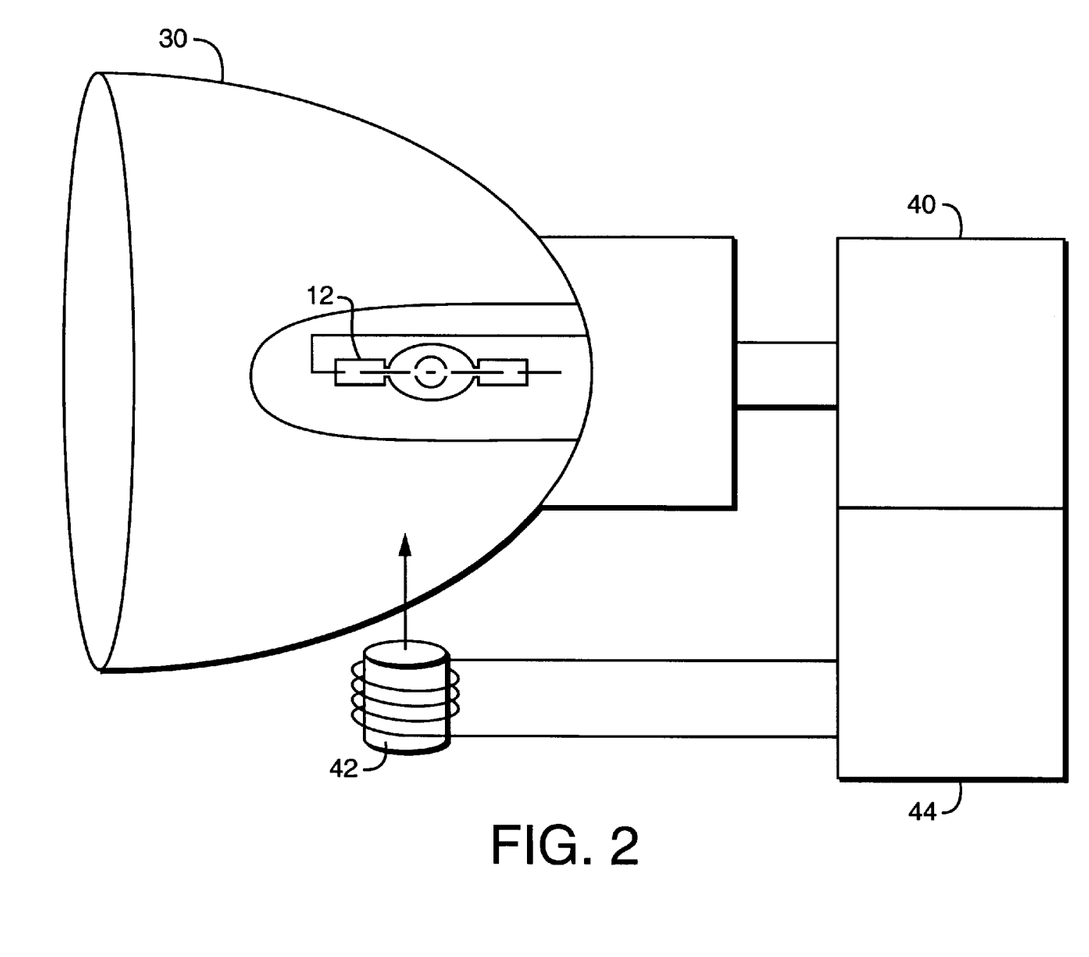
FIG. 2 shows a schematic side view of an arc discharge lamp system.

Alternatively, a simple electromagnet may be used to achieve variable positions of the deflected arc. FIG. 2 shows a schematic diagram of a preferred alternative embodiment of an alternating current vehicle HID lamp with electromagnetic deflection. The alternating current HID lamp with magnetic deflection may be assembled as before with a miniature high intensity discharge (HID) lamp 12, an alternating current lamp controller 40, and an electromagnet 42. The lamp system in FIG. 2, operates in a similar fashion as the system in FIG. 1, however the lamp controller 40 may be structured to provide an alternating current with a direct current component as before, but may forgo the features that alternate the direct current component. Instead the magnetic field varied by altering the current to the electromagnet 42 by an electromagnet controller 44. The electromagnet controller 44 may receive a voltage signal indicating the degree of deflection desired. The power supplied to the electromagnet is proportionately adjusted, while the relative amount of the direct current in the arc remains the same. Again, the preferred location for the electromagnet 42 is on the exterior of any reflector to avoid interference with the optical design. The electromagnet is preferably oriented so the magnetic field is perpendicular to the axis 22.

Figure 3:
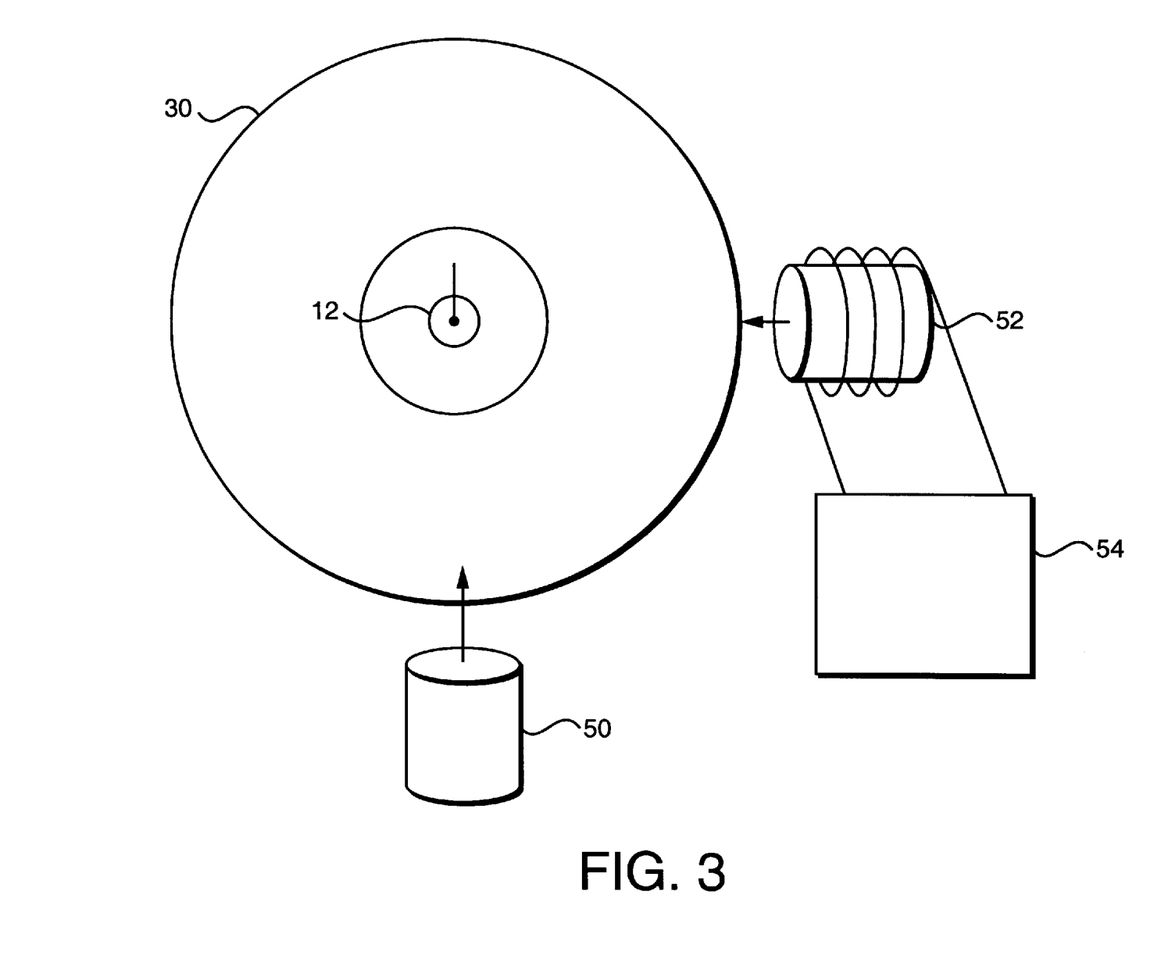
FIG. 3 shows a schematic front view of an arc discharge lamp system.

In a third variation, shown in FIG. 3, a permanent magnet 50 may be used to provide the vertical deflection, as in FIG. 1. Additionally an electromagnet 52 is positioned in the horizontal plane of the arc 26. The permanent magnet 50 then acts to deflect the arc 26 in the vertical plane according to any variations in the direct current component of the arc current. Meanwhile, the electromagnet 52, driven by an electromagnet controller 54, acts to deflect the arc horizontally according to the combined effects of variations in the direct current component of the arc current, and in the electromagnet current.

Figure 4:
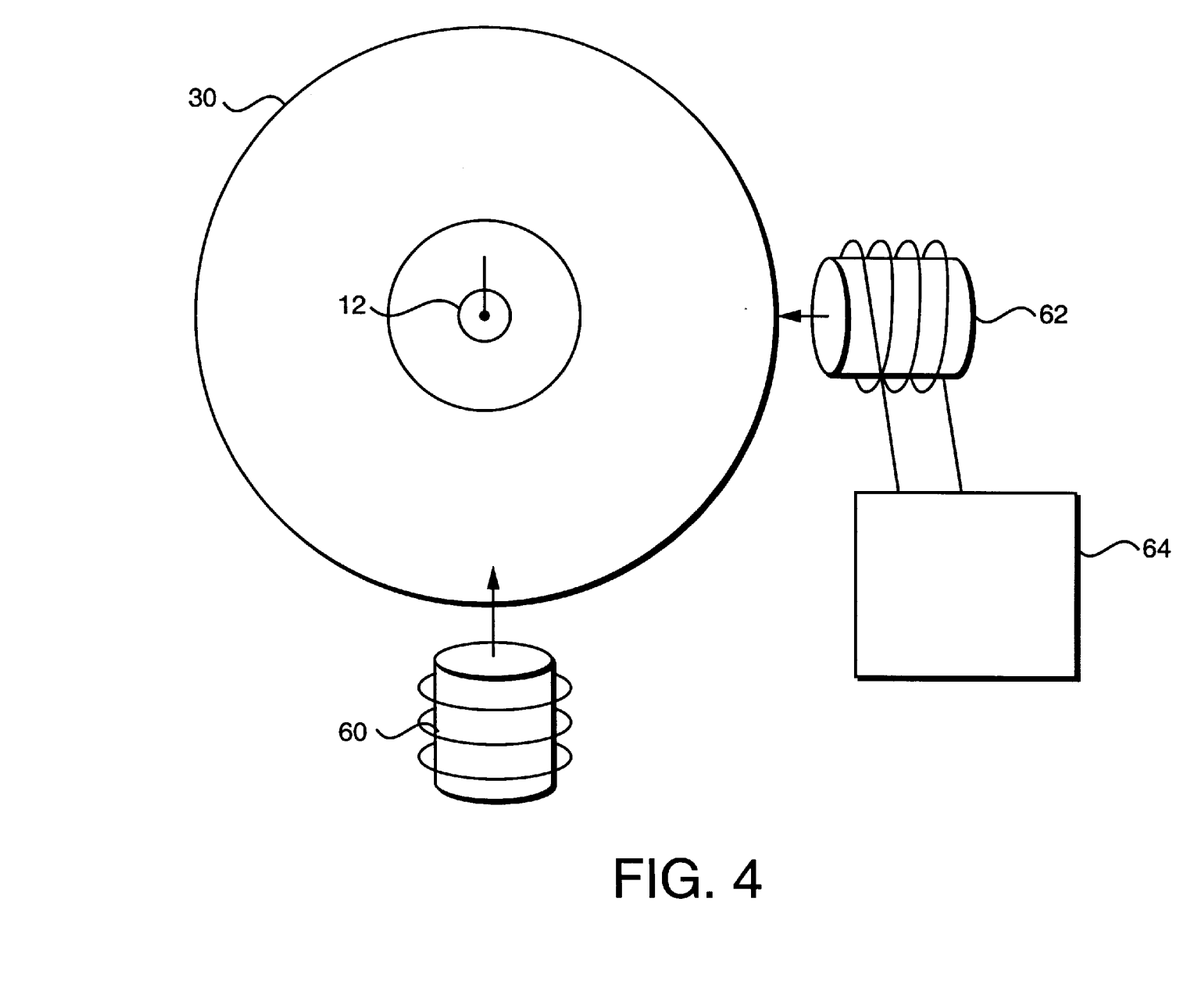
FIG. 4 shows a schematic font view of an arc discharge lamp system.

In a fourth variation, shown in FIG. 4, a first electromagnet 60 may be used to provide the vertical deflection, as in FIG. 2. Additionally a second electromagnet 62 is positioned in the horizontal plane of the arc 26. The first electromagnet 60, driven by electromagnet controller 64, then acts to deflect the arc 26 in the vertical plane according to the combined effects of variations in the direct current component of the arc current, and in the first electromagnet 60 current. Meanwhile, the second electromagnet 62, driven by electromagnet controller 64 acts to deflect the arc horizontally according to the combined effects of variations in the direct current component of the arc current, and in the second electromagnet 62 current. It is understood that the magnet controller 64 may provide the same or different control currents to the first electromagnet 60, and the second electromagnet 62 at the same times or at different times.

In general, once the alternating current in the lamp is given a direct current component existing over a sufficient time period, the arc may be transversely deflected by magnets, whether permanent magnets or electromagnets placed to generate a magnetic field with a component transverse to the arc, and through the arc.

Figure 9:
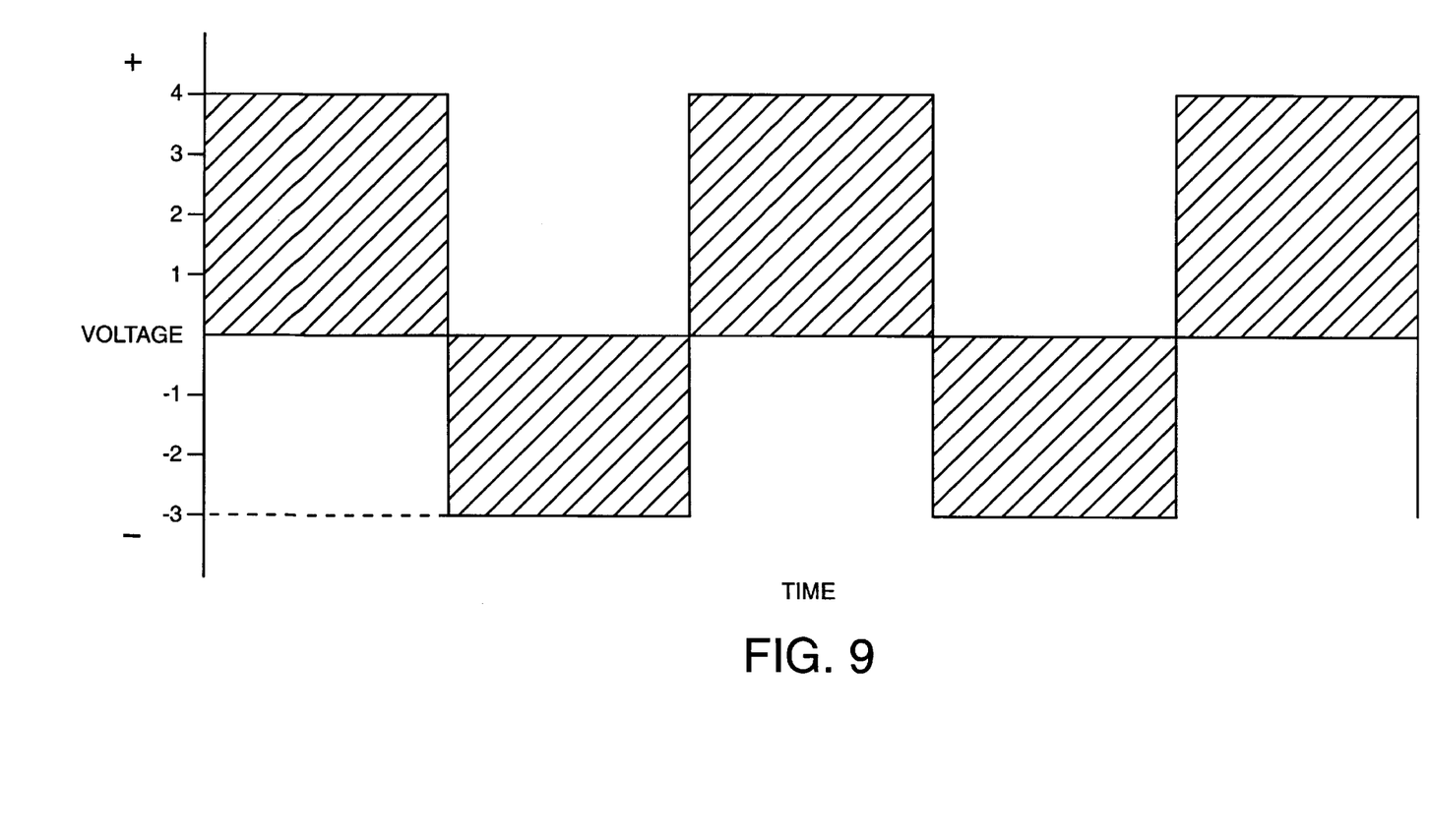
FIG. 9 shows a square wave with a greater positive phase amplitude.
Figure 10:
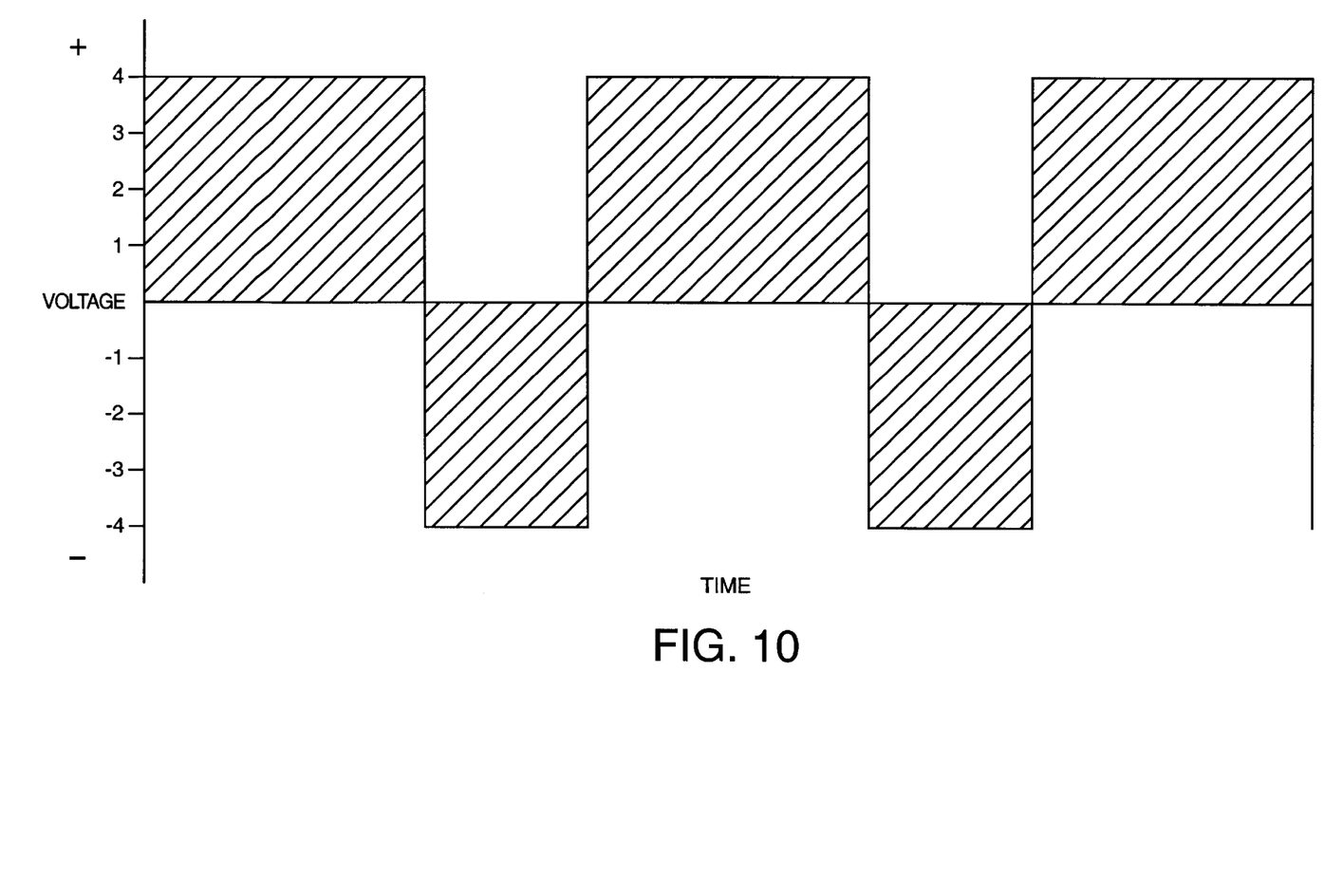
FIG. 10 shows a square wave with a greater positive phase duration.

The alternating current ballast 14, may be one of many designs. The alternating current ballast drives the lamp for proper light output. The relevant feature of concern is the operating frequency of the ballast. The preferred lamp ballast transforms the direct current vehicle battery power to the desired lamp operating voltage. The voltage transformed power is then chopped to form an alternating current. In the preferred embodiment, the alternating current lamp controller provides a square wave signal, and has an operating frequency of about 400 Hz. The duty cycle is adjusted to so that the square wave has a somewhat greater positive duration, and a somewhat lesser negative side duration. Alternatively, a small direct current component (bias current) could be added to the power signal. Effectively, over time the power signal has a somewhat larger positive component than negative component. In one example, the duty cycle was 55.8 percent, while the negative side was 44.2 percent. In the referred embodiment, the lamp operating power has the least direct current component that accomplishes the necessary range of deflections. The lamp then behaves like an alternating current lamp, while maintaining its ability to be magnetically deflected. Lessening the direct current component may be overcome in part by increasing the magnetic field component from the magnets. It is considered elementary electronics that the positive phase of a power signal, relative to the negative phase, may be increased on average by either increasing the average amplitude of the positive phase of the signal by increasing the average duration of the positive phase of the signal or a combination of the two. It is equally elementary that the increase need not occur in each cycle, but may occur in every other cycle, or in some other set of cycles. What is relevant is that over time the average positive phase portion is greater than the average negative phase portion. As examples, FIG. 9 shows a square wave with a greater positive phase amplitude, and FIG. 10 shows a square wave with a greater positive phase duration (greater duty cycle).

The amount of deflection can be controlled in several ways. One method is to increase the size of the direct current component. A second method is to increase the applied magnetic field. In either case, it is possible to switch the arc from a first position in the lamp capsule to a second position in the capsule by increasing, or decreasing the product of the magnetic field and the direct current voltage component.

It is understood that a more complex process of simultaneously adjusting the magnetic field, and the direct current power component can also be made. It is equally understood that the arc need not be deflected merely in the vertical plane, but may be deflected side to side, and that multiple permanent magnets or electromagnets may be used to deflect the arc in complex patterns.

One of the uses of magnetic deflection in a vehicle head lamps is to adapt the headlamp beam pattern to particular driving conditions. To achieve this it is convenient to use two electromagnets. A complete system would consist of a ballast, an alternating current HID lamp, a reflector/housing assembly, two deflection electromagnets, and two deflection electromagnet amplifier systems. The magnetic fields are preferably perpendicular to each other and both are perpendicular to the arc. It is also convenient to align the magnets so that one deflects the arc in the horizontal direction, and the second deflects the arc in the vertical direction. While it is possible to align the magnets at other angles, the system controls to balance the necessary relative deflections by the two electromagnets then becomes cumbersome. The two deflections may both be positive and negative (up and down or left and right) with the same control without the need for a separate polarity changer or a 180 degree phase shifter. The two electromagnets may be driven by two separate amplifier systems. Both amplifier systems may pick up, and use the same input control signal from the ballast. One electromagnet is positioned to be under and transverse to the lamp to provide a vertical and transverse magnetic field, while a second electromagnet is positioned to the side of the lamp to provide a horizontal and transverse magnetic field. Further, it would be convenient to incorporate the vertical deflecting electromagnet into a heat or light shield structure commonly used in some headlamp system.

Magnetic control of the discharge in both the horizontal and vertical directions enables various beam positioning options. The beam may be altered according to vehicle speed. The beam may be made to "look" in the direction of the vehicle is turning. The addition of a second electromagnet to deflect the arc in a direction different from the first deflection further makes the system even more capable of beam variations. Positioning the second electromagnet, is most effective if it aligns the second magnetic field perpendicular to both the original magnetic field and the arc discharge axis. The positioning of the two electromagnets needs to be coordinated with the operation of the driver (or drivers) for the electromagnets. Portions of the two magnetic fields may then be added, and the proportioning of them may change over the driving power cycle or may switch between fixed combinations to move the arc between set positions, either for fixed operation or to cycle the arc between chosen positions. The electronic controls for switching between such fixed beam positions are considered within the skill in the electronic arts.

Figure 7:
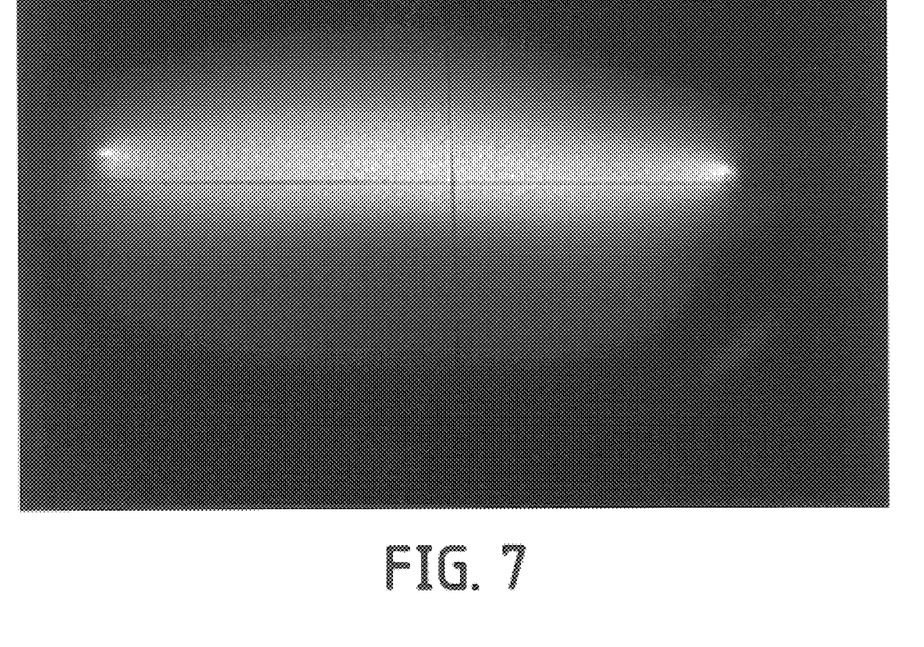
FIG. 7 shows an image of the same D2S lamp as in FIG. 5 operating with input power from a 400 Hz square wave having a 44.4% duty cycle with a permanent magnetic field of about 100 gauss applied at the arc.
Figure 8:
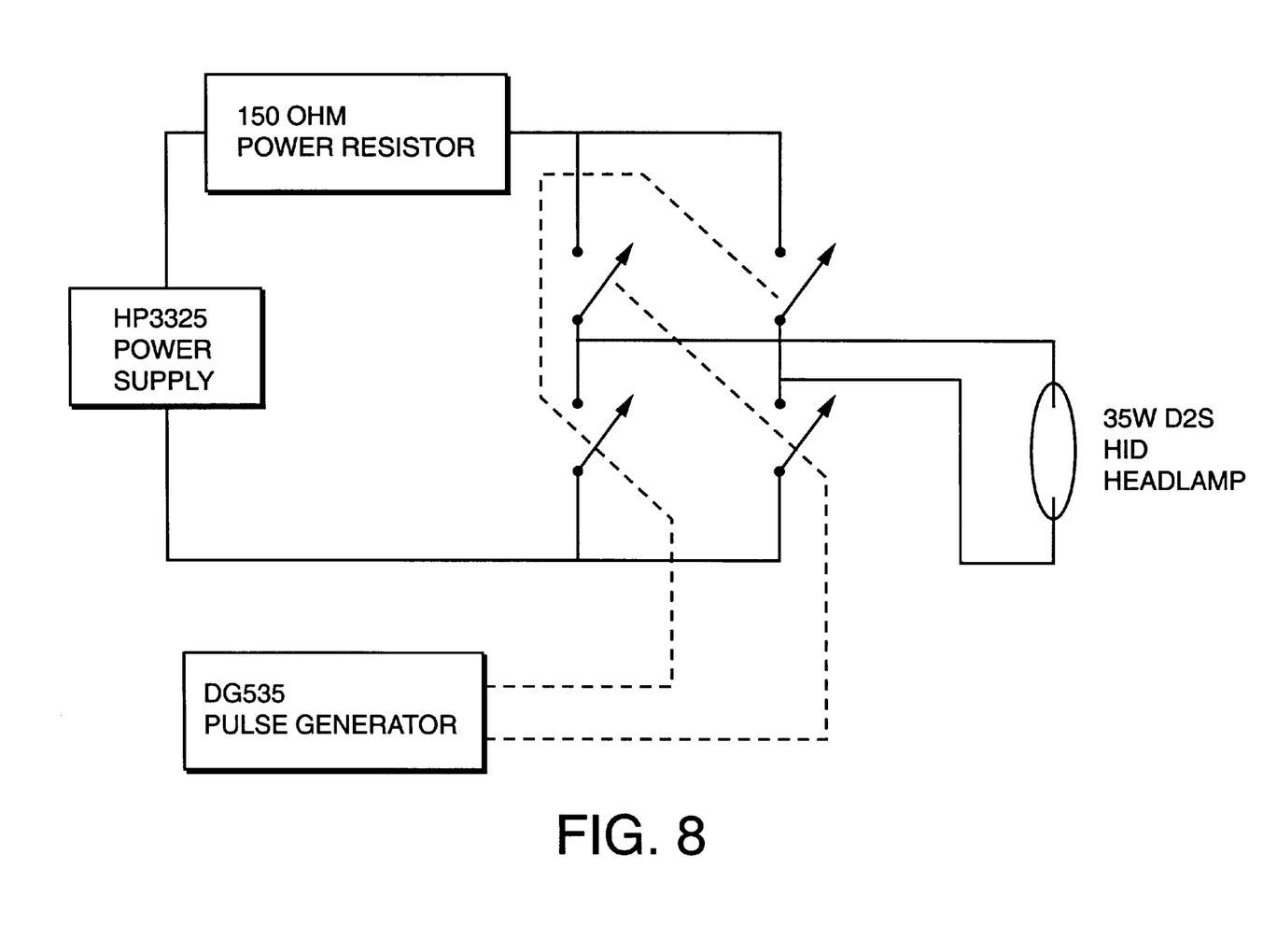
FIG. 8 shows a schematic diagram of a lamp system circuit set up.

In a working example of the method was carried out with some of the conditions as follows: A 35 watt D2S automotive HID headlamp was powered by a power source constructed by combining a current-limited power supply (Hewlett Packard HP6035A), a 150 ohm series power resistor, and an H-bridge consisting of four FET switches driven by a pulse generator (Stanford Research Systems DG535). The ballast ran at 400 Hz and produced a square wave signal. FIG. 8 shows a schematic diagram of the set up. The preferred system was designed to operate at up to about 16 kHz. When operated, a magnetic field was applied by bringing an ALNICO horseshoe-shaped magnet to about 10 centimeters from the lamp. The disclosed operating conditions, dimensions, configurations and embodiments are intended as examples only, and other suitable configurations and relations may be used to implement the invention. The results from this system can be seen in FIGS. 5, 6 and 7.

Figure 5:
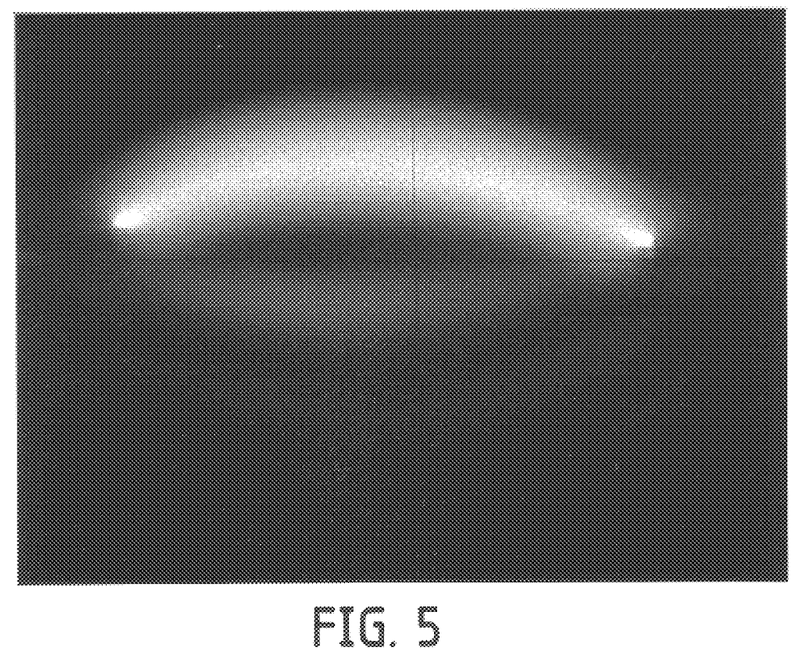
FIG. 5 shows an image an automotive D2S operating normally with input power from a 400 Hz square wave having a 50% duty cycle, and no applied magnetic field.
Figure 6:
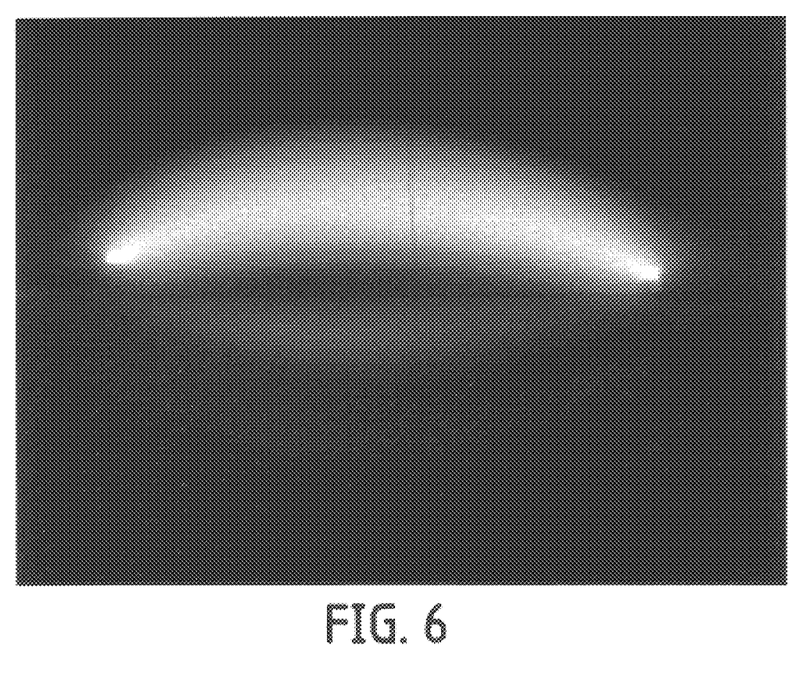
FIG. 6 shows an image of the same D2S lamp as in FIG. 5 with the same input power with the addition of a 100 gauss magnetic field.

FIG. 5 shows an image an automotive D2S discharge lamp operating normally with input power from a 400 Hz square wave having a 50% duty cycle, and no applied magnetic field. FIG. 6 shows an image of the same D2S7 discharge lamp as in FIG. 5 with the same input power with the addition of a 100 gauss magnetic field. A constant magnetic field has little effect on an alternating current arc because the force on the arc during one half-cycle of arc current is opposite to that of the next half-cycle. The inertia of the convective flow is large enough to average out the oscillating force with no net effect at most alternating current arc frequencies of interest. This can be seen in the similarity of FIG. 5 and FIG. 6. FIG. 7. shows an image of the same D2S discharge lamp as in FIG. 5 operating with input power from a 400 Hz square wave having a 44.4% duty cycle with a permanent magnetic field of about 100 gauss applied at the arc.

The arc deflection varies continuously from bowed to straightened as the duty cycle of the square wave is adjusted from 50% to 44% respectively. Further adjustment pushes the arc below the centerline. The arc deflection is proportional to the deviation from 50% duty cycle and the magnetic field strength. Thus, the deviation from 50% duty cycle which is necessary for a given arc deflection is inversely proportional to the strength of the magnetic field. In addition, reversing the magnetic field also reverses the sense of the deviation from 50% which is required. For the image in FIG. 7, the same effect was achieved by reversing the magnet and operating at 55.6% duty cycle. The choice of magnetic field direction can therefore be chosen to minimize the annoyance of any small chemical migration effects which are present with these small asymmetries in current. Chemical migration, which is caused by cataphoresis, is in opposite directions above and below 50% duty cycle.

It should be understood that the described lamp is generally to be operated in a horizontal position; however it is expected that the lamp will at times be operated at angles to the horizontal, even as much as 45 degrees to the horizon. As the horizontal angle increases, the upward convective flow that bows the arc is less and less offset by the transverse magnetic deflection of the arc. In angles above 45 degrees, lamp performance is not expected to be consistent with more horizontal operation. It should also be understood that while the preferred magnetic orientations are perpendicular to the electrode axis and to each other if there are two magnets, variation from these directions is generally functional, just less so with increasing deviation and therefore less desirable. While there have been shown and described what are at present considered to be the preferred embodiments of the invention, it will be apparent to those skilled in the art that various changes and modifications can be made herein without departing from the scope of the invention defined by the appended claims.

What is claimed is:

1. A method of straightening an arc in an arc discharge lamp comprising the steps of:
    a) providing an alternating current operating component between a first electrode and a second electrode of an arc discharge lamp to generate an arc extending between the first electrode and the second electrode;
    b) providing an additional on average direct current operating component between the first electrode and the second electrode of the arc discharge lamp; and
    c) generating a magnetic field having a component in a direction transverse to the arc extension and through the arc.

2. The method in claim 1, wherein the arc extends substantially in a horizontal direction.

3. The method in claim 1, wherein the alternating current has a square wave form.

4. A method of straightening an arc in an arc discharge lamp comprising the steps of:
    a) providing an operating current with a square form between a first electrode and a second electrode of an arc discharge lamp, the operating current having a positive phase and an negative phase, wherein the duty cycle of the positive phase is greater than the duty cycle of the negative phase to generate an arc with a horizontal extension; and
    b) providing a magnetic field substantially in the horizontal direction transverse to, and through the arc.

5. An arc discharge lamp and power supply system comprising:
    a) a light transmissive envelope having a wall defining an enclosed volume;
    b) a first electrode sealingly penetrating the wall to be in electrical contact with the enclosed volume;
    c) a second electrode sealingly penetrating the wall to be in electrical contact with the enclosed volume; an innermost tip of the first electrode and an innermost tip of the second electrode defining an approximately horizontal axis therebetween;
    d) a lamp fill positioned in the enclosed volume;
    e) a power supply providing
        i) substantially an alternating current of sufficient voltage and current, operating between the first electrode and the second electrode to sustain an arc discharge; and
        ii) an on average, direct current operating component between the first electrode and the second electrode of the arc discharge lamp; and
    f) a magnet positioned near the lamp envelope providing a magnetic field with a magnetic field component substantially in a direction transverse to and through the axis.

6. The lamp system in claim 5, wherein the magnet is a permanent magnet.

7. The lamp system in claim 5, wherein the on average direct current component may be varied from one value to another value.

8. The lamp system in claim 6, wherein the magnet is an electromagnet.

9. The lamp system in claim 7, wherein the current to the electromagnet may be varied from one value to another value.

10. The lamp system in claim 5, wherein the alternating current has a square wave form.

11. The lamp system in claim 5, wherein the direct current component comprises a relative increase in the positive phase duty cycle with respect to the negative phase duty cycle of the alternating current.

12. The lamp system in claim 5, wherein the direct current component comprises a direct current bias current.

13. An arc discharge lamp and power supply system comprising:
   a) a light transmissive envelope having a wall defining an enclosed volume;
   b) a first electrode sealingly penetrating the wall to be in electrical contact with the enclosed volume;
   c) a second electrode sealingly penetrating the wall to be in electrical contact with the enclosed volume; an innermost tip of the first electrode and an innermost tip of the second electrode defining an approximately horizontal axis therebetween;
   d) a lamp fill positioned in the enclosed volume;
   e) a power supply providing
      i) substantially an alternating current of sufficient voltage and current, operating between the first electrode and the second electrode to sustain an arc discharge; and
      ii) an on average, direct current operating component between the first electrode and the second electrode of the arc discharge lamp;
   f) a first magnet positioned near the lamp envelope providing a magnetic field with a magnetic field component substantially in a first direction, transverse to and through the axis; and
   g) a second magnet positioned near the lamp envelope providing a magnetic field with a magnetic field component substantially in a second direction transverse to and horizontal through the axis, and transverse to the first direction.

14. The lamp system in claim 13, wherein the first magnet is a permanent magnet and the second magnet is an electromagnet receiving a control current.

15. The lamp system in claim 13, wherein the first magnet is an electromagnet receiving a first control current, and the second magnet is an electromagnet receiving a second control current.

* * * * *